Figure 1:
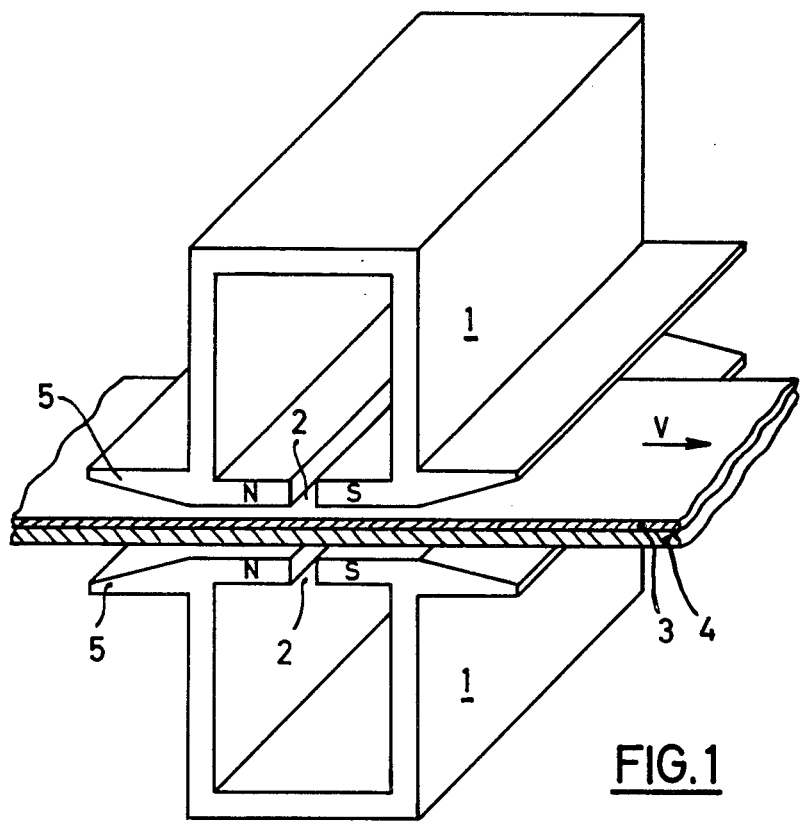

United States Patent [19]

Koester et al.

[11] 4,003,336

[45] Jan. 18, 1977

[54] DEVICE FOR THE MAGNETIC ORIENTATION OF MAGNETIC RECORDING MEDIA

[75] Inventors: Eberhard Koester, Frankenthal; Paul Deigner, Weisenheim; Roland Falk, Achern; Karl Uhl, Frankenthal; Dieter Schaefer, Ludwigshafen, all of Germany

[73] Assignee: BASF Aktiengesellschaft, Ludwigshafen (Rhine), Germany

[22] Filed: Aug. 13, 1975

[21] Appl. No.: 604,129

[30] Foreign Application Priority Data

Aug. 27, 1974 Germany .......................... 2440920

[52] U.S. Cl. .................. 118/640; 317/157.5 MR; 335/284; 360/134
[51] Int. Cl.² ........................................ B05C 11/00
[58] Field of Search ............... 118/640, 49.1, 49.5; 427/47, 48; 101/DIG. 13; 360/134; 317/157.5 MR; 335/284

[56] References Cited

UNITED STATES PATENTS

| 3,021,230 | 2/1962 | Deriaud .................. 118/640 X |
| 3,162,792 | 12/1964 | Hackley et al. ............ 360/134 X |

FOREIGN PATENTS OR APPLICATIONS

| 455,640 | 10/1936 | United Kingdom ................. 427/47 |
| 877,633 | 9/1961 | United Kingdom ................. 427/47 |

*Primary Examiner*—Morris Kaplan
*Attorney, Agent, or Firm*—Johnston, Keil, Thompson & Shurtleff

[57] ABSTRACT

A device for manufacturing magnetic recording media in which the magnetic particles in the recording layer are oriented in a preferred direction, the fluid coating applied to the base being subjected to the action of a magnetic field produced in the air gaps between the spaced apart poles of two magnetic circuits, one on each side of the coated face, arranged symmetrically with respect to the plane of the coated base, the edges of the poles adjacent to the coated base terminating in screening elements shaped in such a way that the distance between the surfaces of the screening elements facing the coated base and the coated base itself increases as the screening elements extend away from the edges of the poles. A high degree of magnetic anisotropy in the recording layer can also be obtained when the magnetic circuits are at a relatively large distance from the still fluid magnetic coating.

2 Claims, 5 Drawing Figures

U.S. Patent          Jan. 18, 1977          4,003,336

DEVICE FOR THE MAGNETIC ORIENTATION OF MAGNETIC RECORDING MEDIA

The present invention relates to a device for the production of magnetically oriented magnetic recording media comprising a non-magnetic base and an anisotropic magnetic coating which contains magnetic particles dispersed in a non-magnetic organic binder which particles are subjected, while the coating is still fluid and prior to solidification thereof, to the action of a magnetic field in order to create magnetic anisotropy in the recording medium.

Magnetic recording media are usually produced nowadays by applying a coating of a dispersion of usually magnetically anisotropic particles in a binder system, in the desired thickness, to a base in the form of a tape or a circular disc which is then immediately passed through a magnetic field while the coating is still fluid. The configuration of the magnetic field is generally such that the particles are oriented parallel to the recording direction. In the case of magnetic tapes, the recording direction is, with few exceptions, the longitudinal direction and in the case of magnetic discs information is recorded in circular concentric tracks.

In known devices for producing magnetic anisotropy in magnetic recording media (U.S. Pat. No. 2,711,901; French Pat. No. 1,008,218; Belgian Pat. No. 891,451; U.S. Pat. No. 3,052,567) pole systems excited by permanent magnets or electromagnets are used to produce the desired field. In particular, it is known (U.S. Pat. No. 2,711,901) that an arrangement of like magnetic poles, symmetrical to the plane of the recording medium, creates a magnetic field parallel to that plane, whereby particularly favorable magnetic anisotropy in the recording medium is produced. Moreover, as is generally known, in this case the eddy current losses in a rotating disc-shaped metallic base such as is used, for example, for magnetic discs are kept to a minimum.

The known apparatus have the disadvantage that a high degree of magnetic anisotropy can only be produced in the recording medium if the binder layer containing the particles moves in very close proximity to the magnetic poles. In some cases, particularly in the manufacture of magnetic discs, it may be necessary to locate the magnetic poles at a much greater distance from the binder layer.

Thus, an object of the invention is to provide a device for manufacturing magnetic recording media exhibiting magnetic anisotropy which is capable of orienting the magnetically anisotropic particles in the fluid binder layer applied to the base even if it is a relatively large distance from the coated base.

We have found that, in the manufacture of magnetic recording media comprising a non-magnetic base and an anisotropic magnetic coating containing magnetic particles dispersed in a non-magnetic organic binder, which particles are subjected, while the coating is still fluid and prior to solidification thereof, to the action of a magnetic field in order to produce magnetic anisotropy in the recording medium, the said field being produced in the air gaps between the spaced apart poles of two magnetic circuits arranged symmetrically with respect to the plane of the coated base, a high degree of magnetic anisotropy can be achieved even when the distance between the coated base and the magnetic circuits producing the magnetic orienting field is relatively large, if the magnetic circuits are designed in such a way that the edges of the poles adjacent to the coated base terminate in screening elements so shaped that the distance between the surfaces of the screening elements facing the coated base and the coated base itself increases as the screening elements extend away from the edges of the poles.

With the device of the present invention it is possible to orient the anisotropic magnetic particles dispersed within a binder system, which particles usually have a coercivity of 24 kA/m (300 oersteds), in the desired preferred direction even if the distance between the magnetic circuits and the plane of the coated base is as much as 20 mm.

The invention will now be explained in further detail with reference to the accompanying drawings.

FIG. 1 is a perspective view of the device according to the invention with two magnetic circuits which are arranged symmetrically with respect to the recording medium, each circuit comprising an air gap and two screening elements.

FIGS. 2a–d show further embodiments of the screening elements.

FIG. 1 shows two magnetic circuits 1 of ferromagnetic material which, when viewed in cross-section, are surrounded by a non-magnetic environment, both inside and outside. From the air gap 2 of each magnetic circuit 1 issues a magnetic field which is used for orienting the magnetic particles present in the binder layer 3 applied to the base 4. In order to achieve optimum anisotropy, the two magnetic circuits 1 are arranged symmetrically with respect to the plane of the coated base with like poles facing one another. The screening elements 5 according to the invention are arranged at the edges of the magnetic circuit adjacent to the coated base. In order to orient the magnetic particles, the coated base is moved past the air gaps with a velocity V.

In FIG. 2, examples of different screening elements are illustrated. According to the invention, the distance between the surfaces of the screening elements and the coated base increases as the screening elements extend away from the edges of the magnetic circuits. Advantageously, this distance increases discontinuously. When viewed in cross-section, therefore, the screening elements follow an arcuate or a rectilinear path or a combination of both as they extend away from the poles of the magnetic circuits. The screening elements consist of a ferromagnetic material; advantageously, they are made of the same material as the magnetic circuit itself and are also integral therewith. Usually, pure spheroidized iron or an iron alloy containing 50% cobalt is used as the ferromagnetic material. The thickness of the screening elements is between 20% and 100% of the wall thickness of the magnetic circuit. The action of the device of the invention does not depend on whether the magnetic circuit is excited by permanent magnets or electromagnetically. The strength of the magnetic field created between each pair of poles which are usually 5 to 40 mm apart goes up to 800 kA/m inside the air gap 2. It has been found that the width of the air gap is advantageously from 2 to 20 mm. With this arrangement a magnetic orienting field is obtained which has a strength of between 50 and 300 kA/m.

With the device of the invention, illustrated by way of example in FIGS. 1 and 2, it is possible to orient the acicular magnetic particles usually employed in the manufacture of recording media, such as $\gamma\text{-Fe}_2\text{O}_3$ and $\text{CrO}_2$. As is well known, these particles are incorporated into a binder system, conventional dispersing agents being employed to achieve uniform dispersion of the particles. In order to reduce friction and improve the hardness or the electrical conductivity of the solidified coating, further additives may be incorporated before, during or after the production of the dispersion. The application of the dispersion containing the magnetic particles to the base may be effected by a known method.

Suitable non-magnetic and non-magnetizable tape base materials are conventional flexible plastics films having a thickness between 3 and 50μm, films of linear polyesters such as polyethylene terephthalate being preferred. The device of the invention can however be used with particular advantage for the magnetic orientation of coated rigid base materials, especially metal discs.

The advantageous effect obtained with the device of the invention as compared with a similar device having no screening elements, is illustrated in the following Example.

EXAMPLE

A circular aluminum disc of conventional thickness and size is rotatably mounted between two magnetic circuits having air gaps in such a way that these air gaps extend along a radius of the disc. The distance between the poles of these circuits is 30 mm. The magnetic circuits are excited electromagnetically. In the absence of electromagnetic excitation an iron oxide particle-containing dispersion usually used in the production of magnetic discs is applied in known manner (U.S. Pat. Nos. 2,913,246 and 3,198,657), the particles having a length of 0.5μm, a diameter of 0.08μm and a coercivity of 24 kA/m (300 oersted). Immediately afterwards, the electromagnets are energized to excite the magnetic circuits and the aluminum disc is caused to rotate. After a few revolutions, electromagnetic excitation is discontinued again and the magnetic layer is dried. The two magnetic circuits are shaped as indicated in FIG. 1. For the purpose of comparison, orientation is effected without the screening elements 5 and with screening elements having the shapes illustrated in FIGS. 2b and c.

In order to assess the magnetic anisotropy, the remanent magnetic flux of the magnetic recording medium thus produced is measured in the usual way, with samples of identical width which have been cut out of the disc along a tangent of a recording track ($\phi_t$) and along a radius ($\phi_r$). The quotient, $\phi_t/\phi_r$, of both values is a measure of the anisotropy of the recording layer. Without anisotropy this quotient is $\phi_t/\phi_r = 1$; it increases with growing anisotropy.

Figure 2A:
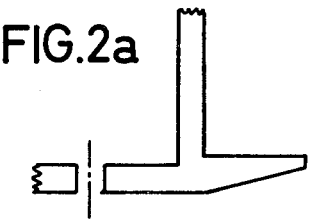
Figure 2B:
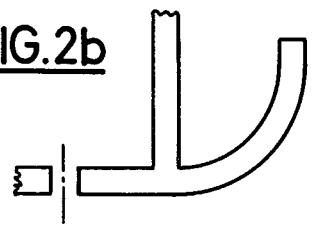
Figure 2C:
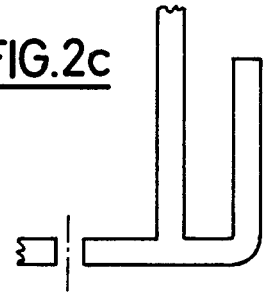
Figure 2D:
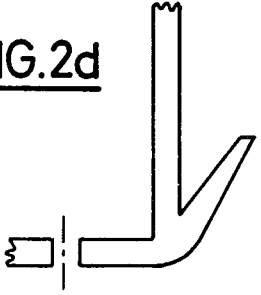

The following Table gives the $\phi_t/\phi_r$ values achieved with and without screening elements using identical electromagnetic excitation:

| Screening element | $\phi_t/\phi_r$ |
| --- | --- |
| without | 1.3 |
| according to Fig. 2b | 1.6 |
| according to Fig. 2c | 2.1 |

These results show that the anisotropy can be increased by up to 60% with the screening elements of the invention.

We claim:
1. A device for magnetically orienting anisotropic magnetic particles in magnetic recording media consisting of a non-magnetic base and a magnetic coating containing the said particles dispersed in a solidified non-magnetic organic binder, the base carrying the fluid dispersion of the said particles in the said binder being passed through a magnetic field, such device comprising:
two magnetic circuits having one air gap each, the air gaps of both circuits being parallel to and opposite each other and being arranged in parallel planes on either side of said base and symmetrically with respect to the plane of the magnetic coating, the direction of the lines of magnetic force in the air gaps of both circuits running in the same direction as the direction of motion of the base and parallel thereto, the edges of said magnetic circuits adjacent to the base carrying the fluid dispersion being provided with screening elements whose distance from each other increases as the screening elements extend away from the edges of the magnetic circuits.
2. A device as set forth in claim 1 in which the thickness of each screening element is between 20% and 100% of the wall thickness of the part of the magnetic circuit to which it is attached.

* * * * *